United States Patent [19]

Bryll

[11] 4,154,472
[45] May 15, 1979

[54] METHOD AND APPARATUS FOR PROTECTING A VEHICLE OCCUPANT

[75] Inventor: Medard Z. Bryll, Palos Park, Ill.

[73] Assignee: Gateway Industries, Inc., Chicago, Ill.

[21] Appl. No.: 831,752

[22] Filed: Sep. 9, 1977

[51] Int. Cl.² ............................................. B60R 21/10
[52] U.S. Cl. ................................. 296/65 A; 280/748; 297/216; 297/384
[58] Field of Search ........................ 296/65 R, 65 A; 297/216, 384; 280/748; 180/82, 91

[56] References Cited

U.S. PATENT DOCUMENTS

| | | | |
|---|---|---|---|
| 2,736,566 | 2/1956 | Hartl | 280/29 |
| 2,796,112 | 6/1957 | Barsky | 296/65 R UX |
| 2,922,461 | 1/1960 | Braun | 296/65 R UX |
| 2,943,866 | 7/1960 | Witter | 280/748 |
| 3,452,834 | 7/1969 | Gaut | 180/82 |
| 3,556,584 | 7/1971 | Simon | 296/65 X |
| 3,591,232 | 1/1971 | Simon | 296/65 R |
| 3,998,291 | 12/1976 | Davis | 180/91 |

Primary Examiner—Joseph F. Peters, Jr.
Assistant Examiner—Gene A. Church
Attorney, Agent, or Firm—Fitch, Even & Tabin

[57] ABSTRACT

A method of and an apparatus for protecting an occupant of a vehicle during a crash comprising reorienting the occupant quickly during the first half of a crash cycle period into an energy absorbing position with occupant's buttocks and femurs being repositioned for causing energy absorption during the second half of the crash cycle. In the preferred apparatus, the occupant's hips are lowered and his knees are raised to place him in an energy absorbing position within about 50 milliseconds and the occupant is married to the vehicle as it crushes during the last half of the crash cycle. The buildup of "g" forces is delayed; the maximum "g" forces imparted to the occupant is reduced; and the occupant's displacement is shortened with the invention.

11 Claims, 7 Drawing Figures

VEIHCLE HORIZONTAL ACCELLERATION

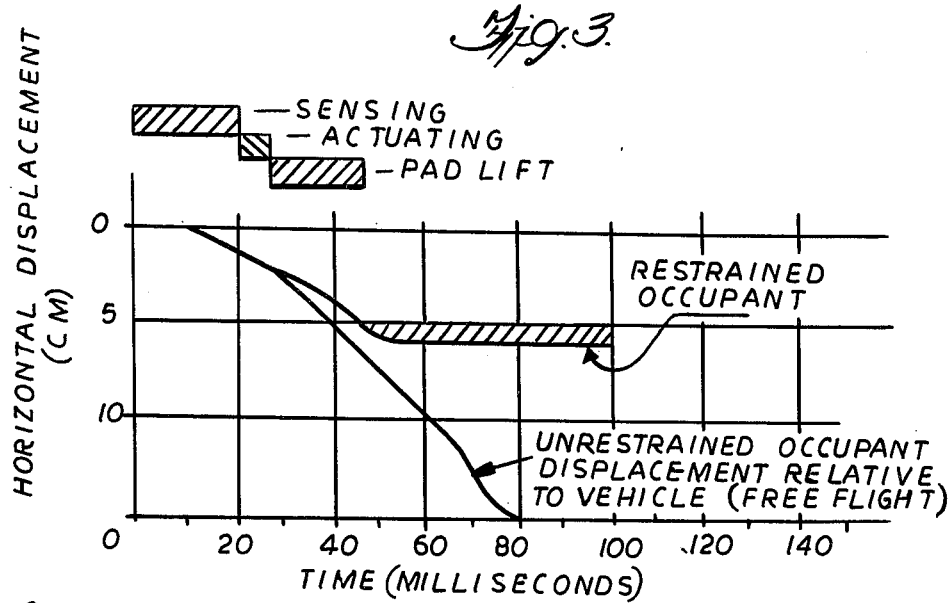
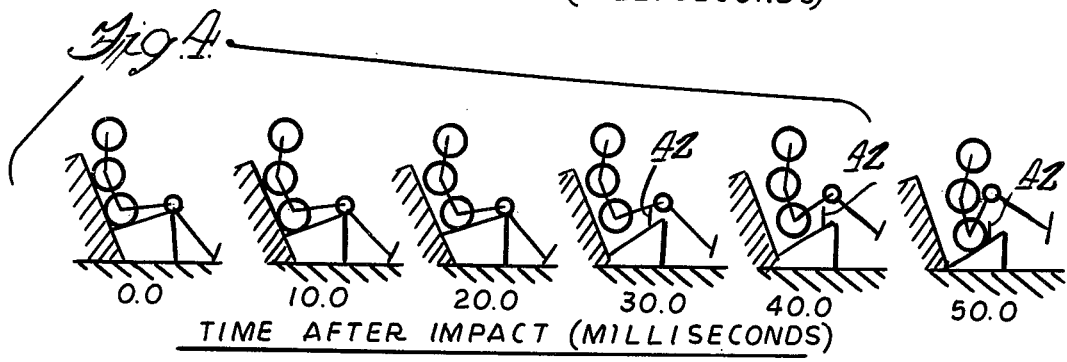
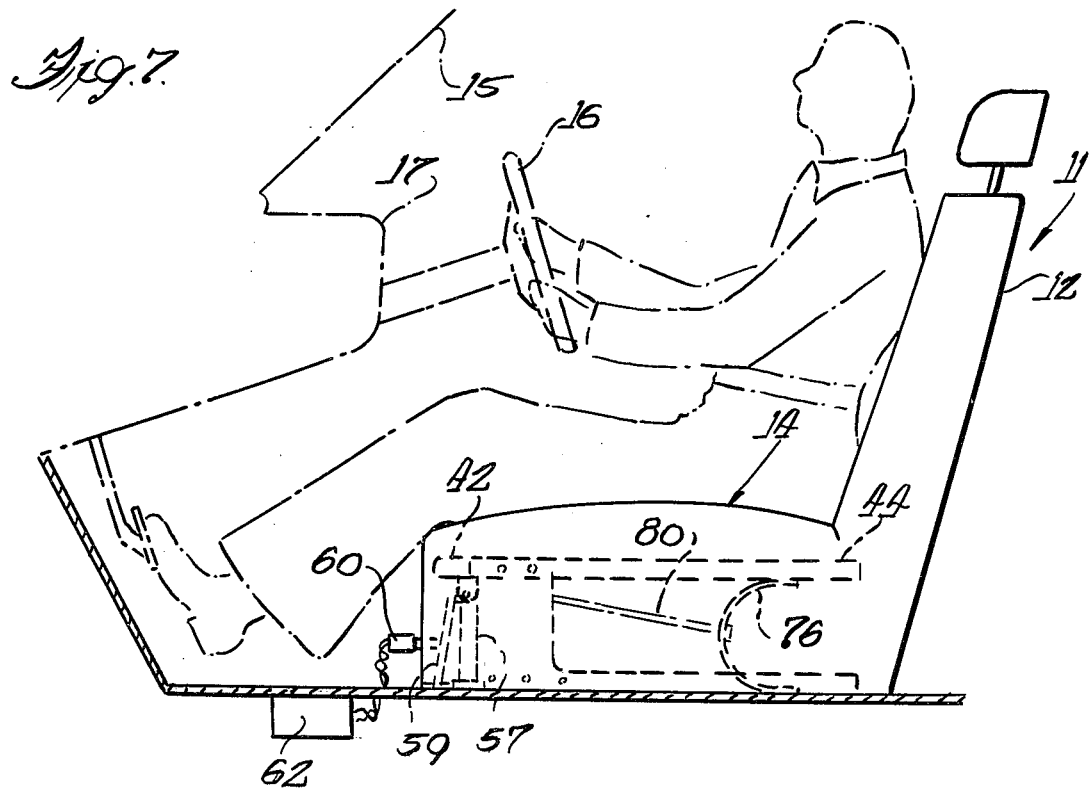

METHOD AND APPARATUS FOR PROTECTING A VEHICLE OCCUPANT

The present invention is directed to a method of and an apparatus for protecting an occupant seated in a vehicle.

The present invention is particularly directed to automotive vehicles and is intended to replace the commonly used seat belt systems employed in today's passenger automobiles and to be used rather than air bags or other passive belt restraint systems. The present commercial seat belt systems are typically three-point systems including a lap belt extending across the lap of the seated occupant and the shoulder belt connected to the lap belt at or adjacent the hip of the seated occupant and extending across the torso of the occupant to an upper and rearward anchor point. Typically, such seat belt systems employ inertia retractors which allow freedom of movement of the upper torso of occupant to a certain degree until an inertia device locks the retractor. At the time of an accident, there is a definite time period during which the occupant builds up momentum and slides across his seat to take up any slack in the belt system and then begins to stretch the belt. Considerable thought has been directed to the strength and stretch characteristics of the belts, but they still stretch at high G loadings and store energy therein and impart a rebound force to the occupant after their maximum stretching as the belt returns to its less stretched state. Most commercial seat belt systems lack any energy absorption devices associated with the belt systems and those that have energy absorption systems generally come into play only after the looseness and the slackness of the belt have been taken up by the occupant's displacing at which time the kinetic energy buildup in the occupant is already substantial so that the energy absorption is generally either too late or too little. The most significant drawback of the three-point system presently used is that it is an active system requiring the passenger to buckle the seat belt. Numerous proposals have been made for various types of passive systems using a three-point belt system, but these have not been adopted commercially on a massive scale although the air bag may soon be used on a massive scale.

In addition to the air bag, there have been proposed a number of other passive systems which primarily involve rotation of entire seats to place the occupant in a position in which the seat then restricts the passenger's forward movement. While a large number of patents are directed to such seat pivoting systems, the patents fail to consider that the large masses and large displacements render these ideas impractical. Furthermore, the present trend is to diminish the size of the vehicle rather than to increasing the size to provide space for such turning of seats and large displacements needed therefor. The time sequence to tilt a rotating seat to the extend desired would require such accelerations and forces that the passenger would be injured when striking portions of the stationary vehicle during this reorientation. For instance, if it is required to rotate the seat at an approximate speed of 60 miles per hour in order to make it effective, the anatomy of the passenger hitting any such object would be injured prior to the actual accident. Also, the body responds very poorly to decelerations in the up-down direction. The tilting seat subjects the upper torso to this and thus creates a harming condition which can be dangerous in high "g" loading. In any event, such systems are further unrealistic in their evaluation of the human body as being a generally single mass when the human body normally acts as a series of hinged masses rotating about various joints such as the hip joints, neck, knees, etc.

It is proposed in U.S. Pat. No. 3,591,232 to swing the knees of the occupant into a position in front of the chest to place the leg femurs in a position generally parallel to the torso. However, this proposal is again unrelated to a time sequence and does not provide a desirable energy absorption technique to dissipate the amount of kinetic energy particularly as it builds up during a crucial time period. Moreover, as will be explained in greater detail, it has been found particularly advantageous to reorient the occupant's body by dropping his hips so they become the major portion of the anatomy for "marrying" the seated occupant to the vehicle so that the occupant may ride down with the vehicle.

The present invention is particularly directed to the reorienting of the seated occupant through small displacements during the initial early time frame, e.g., (50 milliseconds) from the impact of the vehicle to an energy absorption position at which the occupant's body has assumed the position to ride down with the vehicle with energy absorption taking place to minimize the kinetic energy and velocity of the passenger relative to the decelerating vehicle. More specifically, it has been found that the occupant must be captured and married to the vehicle within the first half of the time frame because the substantial displacement of the passenger does not begin until then and that by absorbing energy during the second half of the time frame the velocity of the occupant relative to the vehicle may be reduced whereby the kinetic energy of the occupant is likewise reduced particularly as kinetic energy increases as the square of the velocity. It has been found that the lowering of the hips and raising of the knees through very short displacements and the abutting of the hips against an upraised energy absorbing mechanism within approximately the first 50 milliseconds from vehicle impact allows such a reduction of kinetic energy that the occupant is protected.

Accordingly, a generaly object of the invention is to provide a new and improved method of and apparatus for protecting occupants in a vehicle.

A further object of the invention is to capture the free flight of the occupant and provide him with a controlled trajectory with energy absorption very early in the crash phase to reduce the kinetic energy of the seated occupant thereby minimizing his motion relative to the vehicle structure during the time of the deceleration of the vehicle.

Other objects and advantages of the invention will become apparent from the detailed description taken in connection with the accompanying drawings in which:

FIG. 3 is a graph illustrating displacement of an unrestrained occupant relative to a vehicle and of an occupant restrained in accordance with the present invention during a 30 m.p.h. barrier crash.

FIG. 4 is a diagrammatic illustration of an occupant being repositioned within 50 milliseconds in accordance with the preferred embodiment of the invention.

FIG. 7 is a side view of a vehicle driver seated in a normal driving position.

Figure 1:
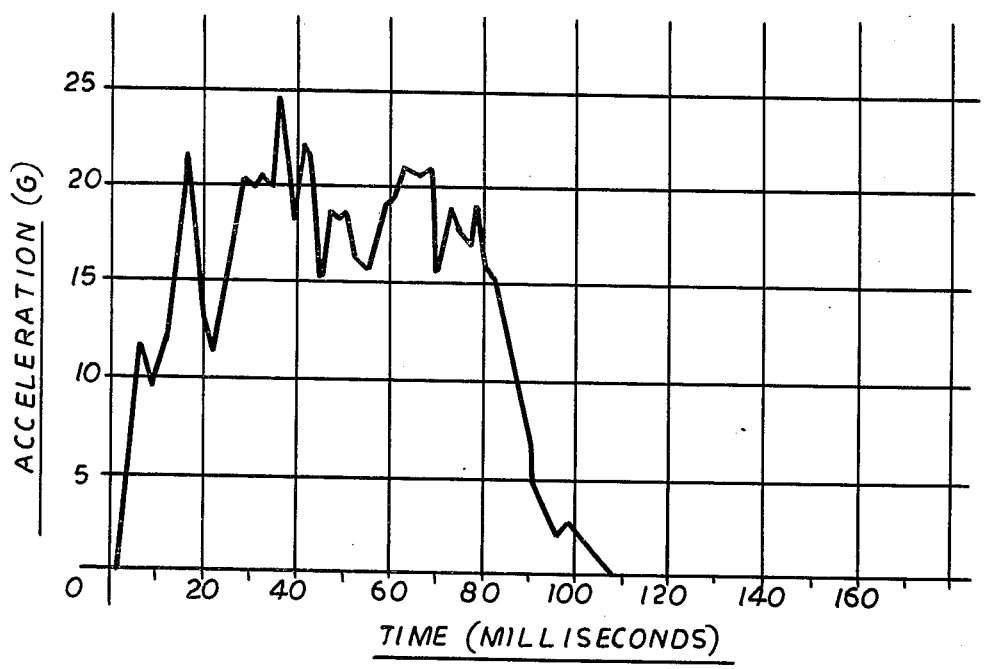
FIG. 1 is a graph illustrating an occupant's and a vehicle's horizontal deceleration during a 30 m.p.h. barrier crash.

As shown in the drawings for purposes of illustration, the invention is embodied in a vehicle seat 11 (FIG. 7) having a backrest 12 with a seat cushion 14 on which the occupant is seated. The occupant illustrated in FIG. 7 is a vehicle driver who is seated in front of a steering wheel 16 and adjacent dashboard 17 of an automobile. As is well known, the occupant must be restrained to minimize his impact with a windshield 15, steering wheel and/or the dashboard.

Today, the commonly used occupant restraint system is a three point seat belt system with a lap belt and a shoulder belt. Because automobile occupants refuse to buckle up this belt system, there is a move to use passive restraint systems such as air bags which inflate in front of the occupant. However, air bags are generally effective only momentarily and are generally ineffective when the automobile is involved in multiple or secondary collisions. It has been proposed in a number of prior art patents to tilt and pivot the entire seat with the occupant therein so that the occupant moves into the seat cushion during a collision. However, such seat tilting systems are impractical because of the heavy weights of the seat and the passenger to be moved and because of the large displacements envisioned in pivoting seats in very short periods of time. U.S. Pat. Nos. 3,556,584 and 3,591,232 disclose a system in which the knees of the seated occupant are raised to a position generally parallel to the occupant's chest and upwardly of the steering wheel with the steering wheel folded back. Again, the very significant displacement of the knees to render the legs generally parallel to the torso requires such a substantial displacement of the knees and the seat portion that it is impractical for the short time frame involved. Other patents such as U.S. Pat. No. 2,796,112 suggest shifting the seat cushion by its inertia to drop the hind quarters of a seated passenger while raising his legs.

In accordance with the present invention, the occupant is shifted within a period of less than 50 milliseconds from his driving position to an energy absorption position so that the kinetic energy being built up in him during vehicle deceleration is being dissipated as work thereby substantially reducing the very rapid buildup of forces and the maximum deceleration forces he is subjected to. This is achieved by sensing the impact early and shifting relatively small masses through relatively small displacements in contrast to the prior art proposals to swing entire seats about an axis. More specifically, in the preferred method, the crash is sensed within about 10 milliseconds from impact and an actuating means operates in about another 15 milliseconds to drop the rear of the seat cushion and the passenger's buttocks in a period of about another 20 milliseconds. Preferably, the knees of the occupant are raised slightly, e.g., six inches or less, simultaneously with the dropping of the occupant's buttocks. This produces a slight turning moment for the occupant which is counter to the direction of his later turning moment due to inertia momentum. Thus, in accordance with the present invention, the vehicle occupant is shifted into an energy absorbing position before his kinetic energy is built up in his body and he or his seat begins to shift due to inertia and then passenger's legs and buttocks act against an energy absorbing means which absorbs energy in sufficient quantities to substantially reduce the maximum occupant deceleration from that which would be otherwise experienced by the occupant. More specifically, in the present invention, the occupant is caught with 50 milliseconds before there is a buildup of kinetic energy due to his momentum and inertia with the occupant held, i.e., married, to vehicle to ride down the same during its crushing and deformation and with the occupant doing work to dissipate his kinetic energy which would be otherwise building up. Herein, the occupant's hips are dropped so that the wide area of the hips, buttocks and undersides of the legs are pushing into the seat during the latter half of the crash time frame and dissipating energy thereby reducing substantially the kinetic energy buildup in the occupant. With the occupant's lower hips and legs repositioned, they are in effect married to the vehicle, so that as the vehicle deforms during crushing the occupant is likewise being decelerated with the vehicle. The preferred system is a dynamic one and preferably employs a variable energy absorption means to filter out any high impulses or spikes of force from injuring the occupant.

It has been found both by computer studies and actual tests that it is possible to drop the hips for a distance of 12 inches or so and to raise the knees six inches or so during initial first-half of the crash cycle or time frame, e.g., within 50 milliseconds, and to capture the occupant; and then during the latter half of the crash time frame to use a variable absorption means to substantially reduce the very large impact forces to the occupant. As will be explained in greater detail, the early capturing of the occupant for the ride down with vehicle results in significantly less displacement of the occupant and often to the extent that the total occupant displacement is less than crush distance of the vehicle so that occupant often will not impact the dashboard or steering wheel. Moreover, the occupant should not experience as significant a rebound as experienced with stretched seat belt systems.

Figure 2:
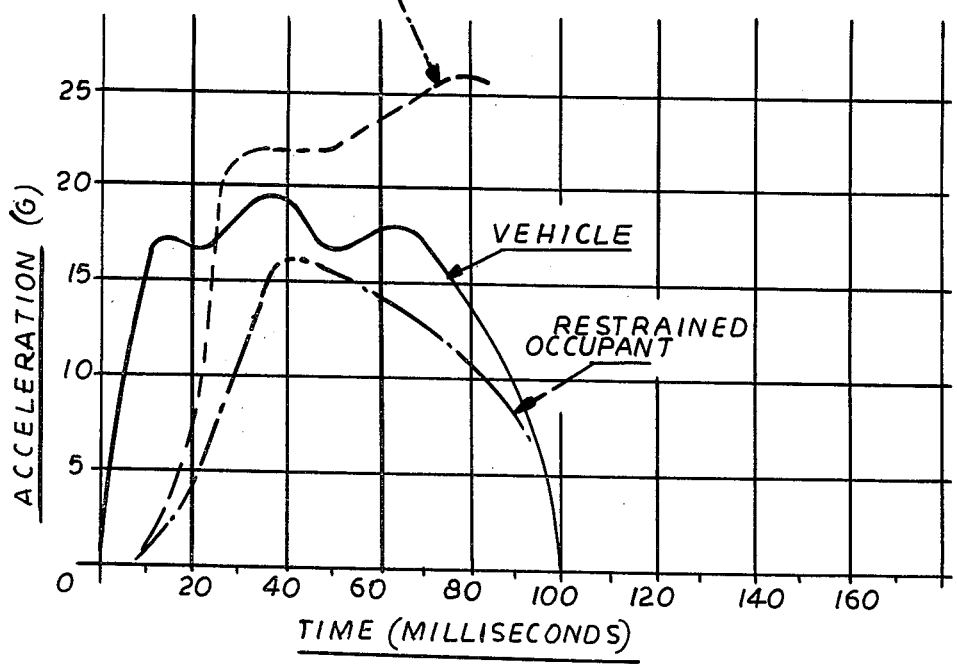
FIG. 2 is a graph illustrating acceleration forces applied to an unrestrained occupant and an occupant restrained in accordance with the present invention during a 30 m.p.h. barrier crash.
Figure 5:
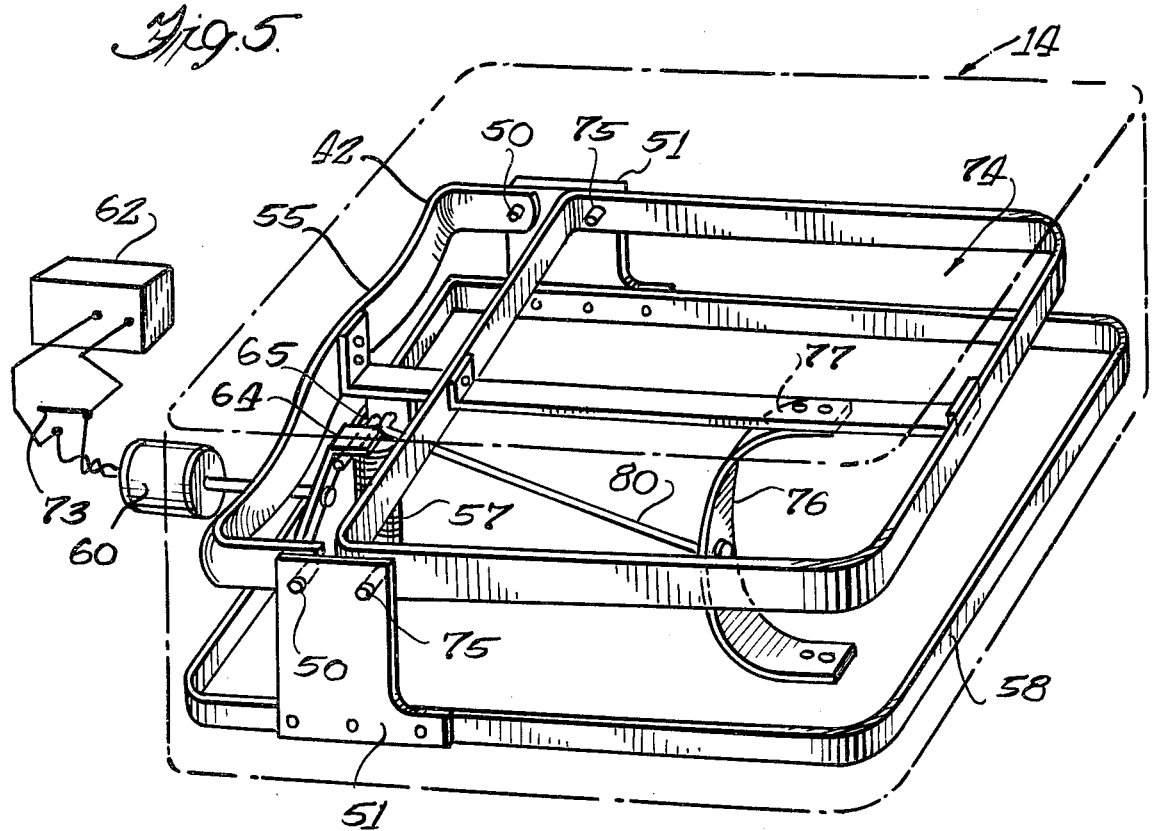
FIG. 5 is a diagrammatic view of means including a seat for repositioning the occupant in accordance with the invention.

Referring now in greater detail to the illustrated embodiment of the invention, the apparatus will be described in connection with a 30 MPH barrier crash in which the vehicle's horizontal acceleration is completed within about 100 milliseconds, as shown in FIG. 1. FIG. 1 is a crash pulse of a composite small vehicle and is more typical of advanced new designs because of stiffness in frame. The deceleration force hits a maximum of about 25 g's. An unrestrained occupant's deceleration lags the vehicle deceleration considerably by about 20 milliseconds, as best seen in FIG. 2. An unrestrained occupant in the vehicle will experience a force of about 25 g's at about 80 milliseconds after the initial impact into the barrier at 30 MPH. The unrestrained occupant experiences a rapid building of "g" forces between 20 to 35 milliseconds, as shown in FIG. 1, whereas an occupant restrained with the present invention is receiving a substantially slower buildup of "g" forces for the same period as indicated in FIG. 1. This difference in buildup of "g" forces is thought to be due to the physical shape of the seat which is undergoing a change in configuration with the rear portion dropping and with the front portion under the knees rising. The change in seat configuration is also accompanied by a turning moment being imparted to the occupant as shown in the sequence of figures in the 20 to 40 millisecond portion of FIG. 4. All of this holds occupant longer and hence may be thought of as a time delay. As can be seen from FIG. 2, during this 20 to 40 millisecond interval, the restrained occupant shifts forwardly as though he were unrestrained until about 25 milliseconds where the actuation of the knee lift and the dropping of the rear seat portion begin to effect the occupant. From 25 to 40 milliseconds, as shown in FIG. 2, the displacement for the restrained occupant is substantially less than for the unrestrained occupant.

During the second half of the crash cycle, e.g., from 50 to 100 milliseconds, the unrestrained occupant will be experiencing his maximum "g" forces until he hits the vehicle when the "g" forces being imparted to him will decrease abruptly. In FIG. 1, the unrestrained occupant is seen to be receiving his greatest "g" forces while the car is crushing and coming to a stop. On the other hand, the restrained occupant is married to the vehicle at about 50 milliseconds and the "g" forces being applied to him are decreasing rapidly and almost coincidentally with the curve shown for the vehicle in FIG. 1. Thus, the restrained occupant is not undergoing free flight and is not going to experience the second collision with the vehicle as will the unrestrained occupant. Likewise, the unrestrained occupant will be experiencing a substantial displacement during the second half of the crash cycle, as shown by the curve in FIG. 2, which terminates when the occupant hits the vehicle, usually the dashboard. On the other hand, the restrained occupant will be experiencing a very reduced displacement during the latter half of the crash cycle as the occupant sinks into the seat and energy is being absorbed. The energy absorption displacement is shown in hatched lines in FIG. 2.

Thus, in accordance with the present invention, it will be seen that the sensing of the crash and the orientation of the occupant is accomplished within the first half of the crash cycle which lasts about 100 milliseconds in this instance, so that the occupant is restrained into an energy absorption position at the time when he needs to dissipate the energy of his momentum within 50 milliseconds and within the distance provided before striking part of the vehicle. As best seen in FIG. 3, the unrestrained occupant will begin his displacement at about 20 milliseconds after initial impact and it is during this period that the occupant will begin to shift his position in a downward direction before he has experienced a substantial displacement relative to the vehicle. The illustrations shown in FIGS. 2 and 3 are for unrestrained occupants such as found with test dummies. The dynamics of the situation are difficult to define precisely, but it appears that the initial occupant displacements found when using test dummies may, in fact, are changed substantially by the occupant bracing himself by his extended arms braced against the dashboard or steering wheel of the vehicle and by his legs braced against a brake pedal or the vehicle's toeboards. In any event, the occupant will not yet have begun to experience the significant displacements relative to the seat and the deceleration forces that he would feel during the second half of the crash cycle if the occupant was not restrained as described herein.

In a diagrammatic illustration shown in FIG. 4, the occupant is reoriented into the preferred position with his hips dropping and his knees being raised slightly, preferably at about 30 milliseconds, although this period may actually be as long as 50 milliseconds. As may be seen from FIGS. 2 and 3, it is best to actually reposition the occupant before the deceleration forces shift the occupant significantly, i.e., more than a few centimeters, and before he experiences the full 20 "g" load of FIG. 2. Preferably, the actuating means for reorienting the occupant operates quickly but not so quickly as would impart accelerations to the occupant of such magnitude that he would injure his knees or other parts of the body should they contact stationary parts of the vehicle during this reorienting of the occupant into the energy absorbing position, shown in the last three places in FIG. 4. It has been found desirable to shift front pad 42 upwardly to interpose it as a barrier to the straight horizontal displacement of the occupant within about 25 milliseconds without damaging the occupant. Because the occupant's hips have dropped downwardly as the knees were raised, the wide area of the hips will press into the seat cushion and begin to absorb energy also at this time. Thus, before 50 milliseconds have elapsed, the occupant will have been captured from his free flight and his trajectory may now be controlled and further energy dissipated to reduce the maximum g's he is subjected to.

The apparatus used to lift the knees and lower the hips may be varied considerably from that illustrated and described herein and still fall within the purview of the present invention. The seat cushion 14 includes a front rim or knee lift portion or pad 42 pivotally mounted at opposite sides thereof by pins 50 to inside frames 51 on the seat for rotation about a generally horizontal axis through the spaced pins 50. During such roation, the knee lift pad 42 pivots from its at rest or seating position, which may be the horizontal position shown in dotted lines in FIG. 6, to its barrier or knee lift position, which is the generally upright position shown in solid lines in FIG. 6. By way of example, the illustrated pad 42 extends downwardly about 6" from its upper edge 55 to the axis of the pivot pins 50 to provide a relatively short displacement distance which can be readily accomplished within 10 milliseconds or so at speeds of 20 MPH or less. The preferred pad 42 is suitably cushioned and padded so that it does not injure the knees when raising the same and when acting as a barrier to the femurs during the energy absorption and ride down forces to come and even to the hips of the occupant if the occupant's hips reach the same.

The preferred actuating means for the knee lift pad 42 may take many forms, but because it is desired to be quick acting and relatively inexpensive. While pyrotechnic devices, such as used with an air bag, are very fast, they are also noisy and expensive. Herein, the actuating means comprises a spring 57 which normally is held in a compressed state and, when released, is ready for quickly pivoting the front knee pad 42 upwardly. The spring is kept compressed between the underside of the knee lift pad 42 and a bottom frame plate 58 until a latch 59 is released by operation of a solenoid 60 which is connected to an inertia switch means 62. The latch 59 comprises a lever pivoted at its lower end by a pin 62 to a floor bracket 63 with an upper hook end 64 overlying a latch pin 65 fixed to a bracket 66 fixed to the underside of knee lift pad 42. The solenoid 60 pulls the hook end 64 from the latch pin 65 to allow the compressed spring 57 to expand and to pivot the knee lift pad.

In this illustrated embodiment of the invention, the inertia switch means 62 may comprise an inertia pendulum weight or other kind of inertia member within the switch means 62 closing electrical contact 73 therein to cause a circuit to operate the solenoid 60 which pivots the latch member 59 to its release position whereupon the spring 57 actuates within approximately 5 milliseconds causing the front pad 42 to rotate through 90° in approximately the next 10 milliseconds so that the knees have been raised within about 35 milliseconds from the time of the initial sensing impact.

Figure 6:
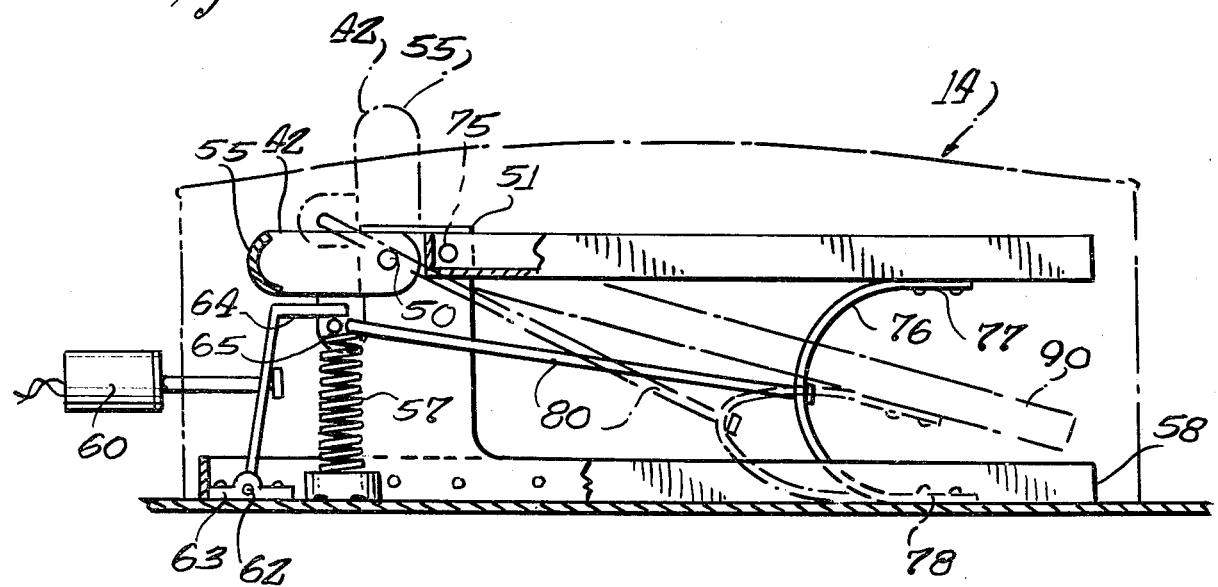
FIG. 6 is a side elevational view of the means of FIG. 6.

Concurrently, with the upward pivotal movement of the front knee pad 42, the hips of the occupant are being lowered as the rear seat rest portion 74 is being dropped from a normal seat position, such as shown in solid lines in FIG. 6, to a lowered energy absorption position, such as shown in dotted lines in FIG. 6. Herein, the rear seat portion 74 is pivotally mounted at its front edge by pivot pins 75 which are also secured to the brackets 51 for pivoting about a horizontal axis through these pins. The rear of the seat portion may be supported by an energy absorbing means such as a spring means 76, which is illustrated as an arcuate leaf spring having an upper end 77 fastened to the underside of the seat portion 74 and with the lower end 78 fastened to the underlying seat frame 58.

The actuating means for shifting the knee lift pad 42 and for lowering the rear seat portion 74 includes a link 80 secured at one end to the center of the leaf spring and secured at its other end to the bracket 72 connected to the underside of the knee front pad 42. Thus, as the knee pad 42 is rotated upwardly, the link 80 is pulled to the left, as in FIG. 6, causing the spring to become more bowed and to pull downwardly the seat portion 74 dropping the occupant's hips.

To provide additional and a more controlled energy absorption during the latter half of the crash time frame, an energy absorbing means in the form of a stiff deformable plate or spring 90 may be inserted in the seat portion 74 for deformation by the hips of the person seated thereon. The preferred plate is a variable force absorbing device which dissipates the kinetic energy of various sizes of occupants by allowing the degree of seat depression to control the amount of work and energy absorbed. That is, a heavy 95th percentile person will depress and deflect the energy absorbing stiff plate 90 to a greater degree than a 50th percentile person for the same velocity involved at the time of the crash. Further, the rate of deformation can be made proportional to the size of the vehicles so that the larger and more flexible cars will have energy absorbing devices 90 which operate for larger periods of time than will energy devices 90 for smaller and stiffer automobiles. The rate of deformation and energy absorption then may be optimized for the size and stiffness of the automobile involved.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of protecting a vehicle occupant during a crash having a time frame beginning with the impact with another object and ending with the crushing of the vehicle, said method comprising the steps of: during the first half of the time frame sensing a deceleration of the vehicle above a predetermined magnitude and prior to any significant displacement of the occupant in a free flight trajectory, allowing the occupant to shift forwardly relative to the seat back, repositioning the occupant by raising the occupant's knees and lowering the occupant's hips relative to the position thereof prior to said sensing step by dropping the rear portion of the seat from its position prior to the sensing step; and during the second half of the crash time frame, having the occupant's hips and legs acting on an energy absorbing means with the occupant riding down and decelerating with the vehicle as the vehicle crushes.

2. A method in accordance with claim 1 in which the repositioning of the occupant includes the steps of raising a barrier at the occupant's knees to raise his knees through a distance of about 6" or less and lowering the occupant's hips through a distance of about 12" or less.

3. A method in accordance with claim 1 in which the first half of the time frame includes the steps of sensing the deceleration within a period of about 10 milliseconds or less, operating an actuating means through a following period of about 15 milliseconds or less and raising the occupant's knees and dropping his hips during a subsequent period of about 20 milliseconds.

4. A method in accordance with claim 1 in which the step of raising the knees and lowering the hips imparts a turning moment to the occupant working in opposition to the displacement of the occupant during deceleration and providing a time delay in the buildup of "g" forces being experienced by the occupant.

5. A method in accordance with claim 1 in which a variable energy absorption means filters out high impulses of force being applied to the occupant.

6. A method of protecting a vehicle occupant at the time of crash comprising the steps of: sensing a deceleration of the vehicle above a predetermined magnitude, within 50 milliseconds of the sensing of said deceleration of above said predetermined magnitude and prior to any substantial acceleration of the occupant, shifting the occupant to an energy absorbing position by raising the occupant's knees and lowering the occupant's buttocks relative to their original positions prior to the sensing step by dropping the rear of a seat portion supporting the buttocks, absorbing energy and limiting displacement of the occupant by deforming an energy absorbing means at the occupant's buttocks and thighs to reduce the occupant's acceleration during at least the period of 50 to 100 milliseconds after the crash to try to reduce the occupant's displacement to less than the vehicle's crush.

7. A method in accordance with claim 6 including the further steps of raising the front seat edge of the occupant's seat to raise the occupant's knees and dropping the seat portion supporting the buttocks to lower the same while leaving the seat back stationary.

8. A method in accordance with claim 6 including the further step of deforming a means located below the occupant's buttocks at a rate dependent upon the force applied thereto to provide a variable rate absorbing means for the occupant.

9. A method in accordance with claim 6 in which a crash is sensed within a period of 20 milliseconds or less after impact, in which knees are raised and buttocks are lowered within an additional 30 milliseconds after impact.

10. In a vehicle having a seat for a passenger, a safety system comprising a seat for the occupant,
 a movable barrier at the front portion of the occupant seat movable from a lower position to an upper barrier position to limit forward shifting of the occupant,
 means for supporting the femurs and buttocks of the occupant at a predetermined position and for lowering the femurs and buttocks from said predetermined position to an energy absorption position, sensing means for sensing a vehicle impact above a predetermined level, means for actuating said movable barrier to said upper position to lift femurs of the occupant and for shifting said femurs and buttocks to said energy absorption position during the first half of the crash time frame, and energy absorption means engageable by said occupant in said energy absorption position to limit forward motion of the occupant along the seat and convert the kinetic energy occasioned by the occupant's movement into work to limit and stop free flight of the occupant during the second half of the crash time frame.

11. A vehicle in accordance with claim 10 in which said movable barrier is pivotally mounted at the front end of the seat for movement to raise the knees about 6" or less and in which said means for supporting the femurs and buttocks comprise a rear portion of the seat mounted for dropping through a distance of about 12" or less.

* * * * *